United States Patent
Trocki et al.

(10) Patent No.: US 11,757,959 B2
(45) Date of Patent: Sep. 12, 2023

(54) DYNAMIC DATA STREAM PROCESSING FOR APACHE KAFKA USING GRAPHQL

(71) Applicant: Red Hat, Inc., Raleigh, NC (US)

(72) Inventors: Wojciech Trocki, Waterford (IE); Manyanda Chitimbo, Creteil (FR); Enda Martin Phelan, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 17/167,470

(22) Filed: Feb. 4, 2021

(65) Prior Publication Data
US 2022/0247803 A1 Aug. 4, 2022

(51) Int. Cl.
*H04L 12/00* (2006.01)
*H04L 65/61* (2022.01)
*G06F 16/245* (2019.01)

(52) U.S. Cl.
CPC ............ *H04L 65/61* (2022.05); *G06F 16/245* (2019.01)

(58) Field of Classification Search
CPC ............... H04L 65/4069; G06F 16/245; G06F 16/24578; G06F 16/24568
USPC ......................................................... 709/219
See application file for complete search history.

(56) References Cited

U.S. PATENT DOCUMENTS

| | | | |
|---|---|---|---|
| 9,946,593 B2 | 4/2018 | Bishop et al. | |
| 10,027,728 B2 | 7/2018 | Yang et al. | |
| 10,558,671 B2 * | 2/2020 | Tamjidi | G06F 16/28 |
| 11,126,538 B1 * | 9/2021 | Ophir | G06F 11/3644 |
| 2018/0332367 A1 | 11/2018 | Kaitchuck et al. | |
| 2020/0007496 A1 * | 1/2020 | Park | H04L 63/0407 |
| 2020/0125572 A1 | 4/2020 | Hanckel et al. | |
| 2020/0285454 A1 * | 9/2020 | Antonevich | G06F 8/427 |
| 2022/0035829 A1 * | 2/2022 | Ke | G06F 16/258 |

(Continued)

FOREIGN PATENT DOCUMENTS

EP 3564829 11/2019

OTHER PUBLICATIONS

Patterson, Maria, "Data Stream Processing for Newbies With Kafka, KSQL, and Postgres," https://https://highalpha.com/data-stream-processing-for-newbies-with-kafka-ksql-and-postgres/, 2019.

(Continued)

*Primary Examiner* — Frantz Coby
(74) *Attorney, Agent, or Firm* — Womble Bond Dickinson (US) LLP

(57) ABSTRACT

Systems and methods for specifying a stream processing topology via a client-side API without server-side support. A schema may be generated by a client-side application using a query language and transmitted to a stream processor registry, wherein the schema defines a desired data stream. The stream processor registry, acting as a server-side run time corresponding to the query language, may store the schema as metadata. The stream processor registry may generate a stream processing topology based on the metadata to obtain data relevant to the data stream and generate a user-specific topic comprising the data relevant to the data stream. The stream processor registry may filter the data relevant to the data stream based a subscription call by the client to generate a target topic comprising portions of the data relevant to the data stream.

20 Claims, 7 Drawing Sheets

(56) References Cited

U.S. PATENT DOCUMENTS

2022/0309044 A1* 9/2022 Trocki ............... G06F 16/2379

OTHER PUBLICATIONS

Karu, Jonathan, "Towards a GraphQL Proxy for Apache Kafka," https://www.ims.ut.ee/www-public2/at/2020/bsc/atprog-courses-bakalaureuset55-loti.05.029-jonathan-karu-text-20200605.pdf, 2020.
Spann, Tim, "Crafting Apache Kafka Topics Dynamically as Part of a Dataflow," https://dzone.com/articles/creating-apache-kafka-topics-dynamically-as-part-o, Aug. 13, 2019.

* cited by examiner

DYNAMIC DATA STREAM PROCESSING FOR APACHE KAFKA USING GRAPHQL

TECHNICAL FIELD

Aspects of the present disclosure relate to data stream processing systems, and more particularly, to specifying the functions of a data stream processor from the client side.

BACKGROUND

Stream processing is a big data technology that focuses on the real-time processing of continuous streams of data in motion (i.e., data is computed directly as it is produced or received). It is used to query continuous data streams and quickly detect conditions within a small time period from the time of receiving the data. Stream processing tools and technologies are available in a variety of formats such as distributed publish-subscribe messaging systems (e.g., the Apache Kafka™ system), distributed real-time computation systems (e.g., the Apache Storm™ system), and streaming data flow engines (e.g., the Apache Flink™ system). Stream processing systems may be implemented in a variety of architectures including a micro-services architecture (e.g., the Red Hat™ OpenShift™ platform)

Distributed stream processing systems often involve the use of geographically distributed architectures for processing large data streams in real time to increase efficiency and reliability of the data ingestion, data processing, and the display of data for analysis. Distributed stream processing can also refer to an organization's ability to centrally process distributed streams of data originating from various geographically dispersed sources, such as internet of things (IoT) connected devices and cellular data towers. Distributed data streaming platforms (e.g., Apache Kafka) may publish, subscribe to, store, and process streams of records in real time. They are also designed to handle data streams from multiple sources and deliver them to multiple consumers.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
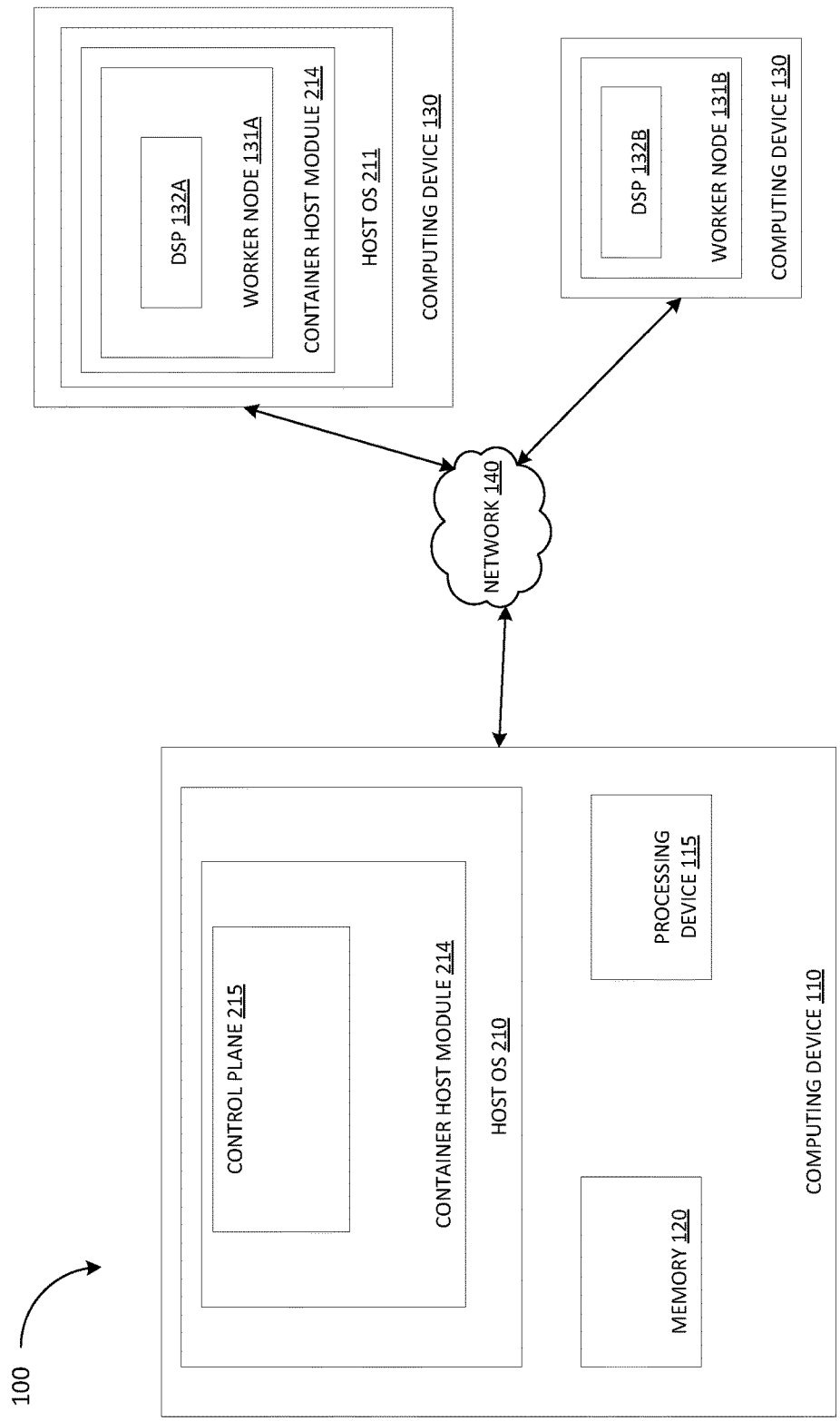
FIG. 1 is a block diagram that illustrates an example system, in accordance with some embodiments of the present disclosure.

Typically, large data batch jobs and data streaming requires server-side developers to create strongly defined pipelines (referred to herein as "topics") and publish/subscribe handlers in the specific parts of the system. However, streaming data directly to web and mobile clients is becoming the de facto standard that not only gives a much better alternative to server-side queries but also builds completely new use cases that would not have been possible before. Developers building reactive user interfaces to accommodate for such direct data streaming need to design specific flows (execution logic) for the data stream which requires the deployment of specialized elements in micro-service architectures called stream processors. There are currently a number of tools that provide stream processor functionality such as reading and processing streamed data. These tools may be implemented as clustered services (Apache Storm, Apache Spark etc.) or frameworks (Kafka Streams, Node Streams), for example. Deployment of such tools requires the maintenance and building of numerous abstractions in particular coding languages.

One technology that gives developers the ability to subscribe to server-side changes are GraphQL subscriptions. Although subscriptions are effective for generic data streaming platforms, they are typically difficult to implement the server-side because most data streaming platforms do not provide the ability to stream anything that has been defined client-side or the ability to specify streaming requirements from the client-side without engaging with server-side functionality or deploying serverless containers.

The present disclosure addresses the above-noted and other deficiencies by providing techniques for building client-side data streaming solutions where web and mobile client applications can control how the streaming platform works by utilising a query language e.g., GraphQL to define functions/rules for mapping various topics and transforming them into computable data streams. Embodiments of the present disclosure may utilize a processing device to generate a schema at a client-side application using a query language, wherein the schema comprises one or more mutations that collectively define a data stream and can be executed by a server-side run time corresponding to the query language. A stream processor registry acting as a server-side run time corresponding to the query language may receive the schema from the client and store the mutations as metadata that defines a stream processing topology. The stream processor registry may read one or more topics provided by a data streaming platform to obtain data relevant to the data stream based on the one or more mutations and generate a user-specific topic comprising the data relevant to the data stream. The stream processor registry may perform these functions in response to receiving a subscription call to the user-specific topic from the client. In addition, the stream processor registry may filter the data relevant to the data stream based on one or more of: offset rules, filtering rules, aggregation rules, and windowing rules specified by the call. In this way, a target topic comprising the portions of the data relevant to the data stream may be generated and the portions of the data relevant to the data stream may be provided to the client.

FIG. 1 is a block diagram that illustrates an example system 100. As illustrated in FIG. 1, the system 100 includes a computing device 110, and a plurality of computing devices 130. The computing devices 110 and 130 may be coupled to each other (e.g., may be operatively coupled, communicatively coupled, may communicate data/messages with each other) via network 140. Network 140 may be a public network (e.g., the internet), a private network (e.g., a local area network (LAN) or wide area network (WAN)), or a combination thereof. In one embodiment, network 140 may include a wired or a wireless infrastructure, which may be provided by one or more wireless communications systems, such as a WiFi™ hotspot connected with the network 140 and/or a wireless carrier system that can be implemented using various data processing equipment, communication towers (e.g. cell towers), etc. In some embodiments, the network 140 may be an L3 network. The network 140 may carry communications (e.g., data, message, packets, frames, etc.) between computing device 110 and computing devices 130. Each computing device 110 and 130 may include hardware such as processing device 115 (e.g., processors, central processing units (CPUs)), memory 120 (e.g., random access memory 120 (e.g., RAM)), storage devices (e.g., hard-disk drive (HDD), solid-state drive (SSD), etc.— not shown), and other hardware devices (e.g., sound card, video card, etc.—not shown). In some embodiments, memory 120 may be a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices. Memory 120 may be configured for long-term storage of data and may retain data between power on/off cycles of the computing device 110. Each computing device may comprise any suitable type of computing device or machine that has a programmable processor including, for example, server computers, desktop computers, laptop computers, tablet computers, smartphones, set-top boxes, etc. In some examples, each of the computing devices 110 and 130 may comprise a single machine or may include multiple interconnected machines (e.g., multiple servers configured in a cluster). The computing devices 110 and 130 may be implemented by a common entity/organization or may be implemented by different entities/organizations. For example, computing device 110 may be operated by a first company/corporation and one or more computing devices 130 may be operated by a second company/corporation. Each of computing device 110 and computing devices 130 may execute or include an operating system (OS) such as host OS 210 and host OS 211 respectively, as discussed in more detail below. The host OS of a computing device 110 and 130 may manage the execution of other components (e.g., software, applications, etc.) and/or may manage access to the hardware (e.g., processors, memory, storage devices etc.) of the computing device. In some embodiments, computing device 110 may implement a control plane (e.g., as part of a container orchestration engine) while computing devices 130 may each implement a worker node (e.g., as part of the container orchestration engine).

In some embodiments, a container orchestration engine 214 (referred to herein as container host 214), such as the Red Hat™ OpenShift™ module, may execute on the host OS 210 of computing device 110 and the host OS 211 of computing device 130, as discussed in further detail herein. The container host module 214 may be a platform for developing and running containerized applications and may allow applications and the data centers that support them to expand from just a few machines and applications to thousands of machines that serve millions of clients. Container host 214 may provide an image-based deployment module for creating containers and may store one or more image files for creating container instances. Many application instances can be running in containers on a single host without visibility into each other's processes, files, network, and so on. Each container may provide a single function (often called a "micro-service") or component of an application, such as a web server or a database, though containers can be used for arbitrary workloads. In this way, the container host 214 provides a function-based architecture of smaller, decoupled units that work together.

By their nature, containerized applications are separated from the operating systems where they run and, by extension, their users. The control plane 215 may expose applications to internal and external networks by defining network policies that control communication with containerized applications (e.g., incoming HTTP or HTTPS requests for services inside the cluster).

A typical deployment of the container host 214 may include a control plane 215 and a cluster of worker nodes 131, including worker nodes 131A and 131B (also referred to as compute machines). The control plane 215 may include REST APIs which expose objects as well as controllers which read those APIs, apply changes to objects, and report status or write back to objects. The control plane 215 manages workloads on the worker nodes 131 and also executes services that are required to control the worker nodes 131.

The cluster of worker nodes 131 are where the actual workloads requested by users run and are managed. The worker nodes 131 advertise their capacity and a scheduler (not shown), which is part of the control plane 215, determines which worker nodes 131 containers and pods will be started on. Each worker node 131 includes functionality to accept and fulfill requests for running and stopping container workloads, and a service proxy, which manages communication for pods across worker nodes 131. A worker node 131 may be implemented as a virtual server, logical container, or GPU, for example.

One type of application that the container host 214 may run is a data streaming platform 132A (hereinafter referred to as "DSP 132A"), such as Apache Kafka™. The DSP 132A may publish, subscribe to, store, and process streams of records in real time. The DSP 132A may handle data streams from multiple sources and deliver them to multiple clients. The DSP 132A may be built into streaming data pipelines that share data between systems and/or applications of the container host 214, and may also be built into the systems and applications of the container host 214 that consume that data. In some embodiments, the DSP 132A may integrate with the container host 214 in order to provide e.g., data integration among other functionality.

Figure 2A:
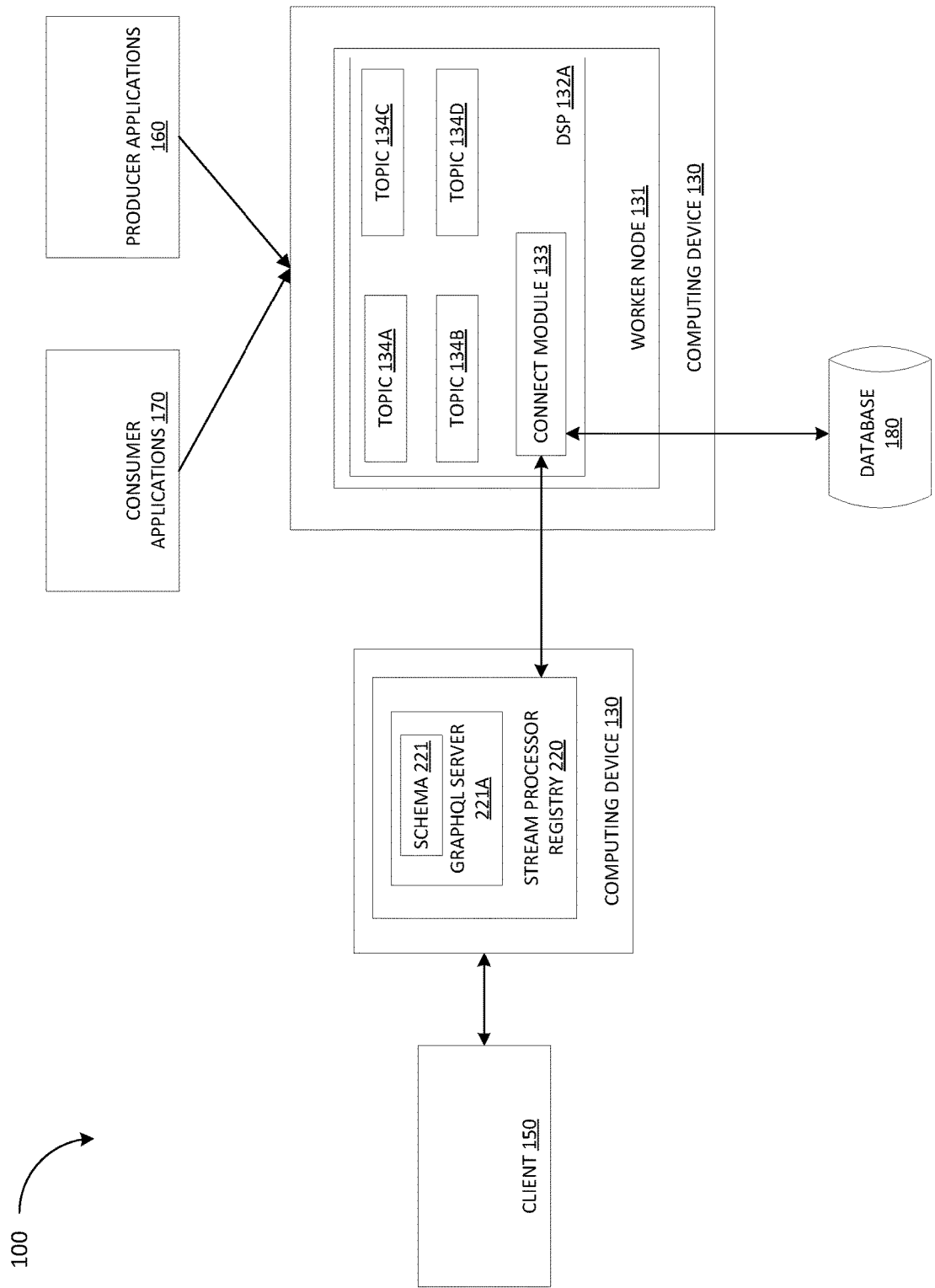
FIG. 2A is a block diagram that illustrates an example system, in accordance with some embodiments of the present disclosure.
Figure 2B:
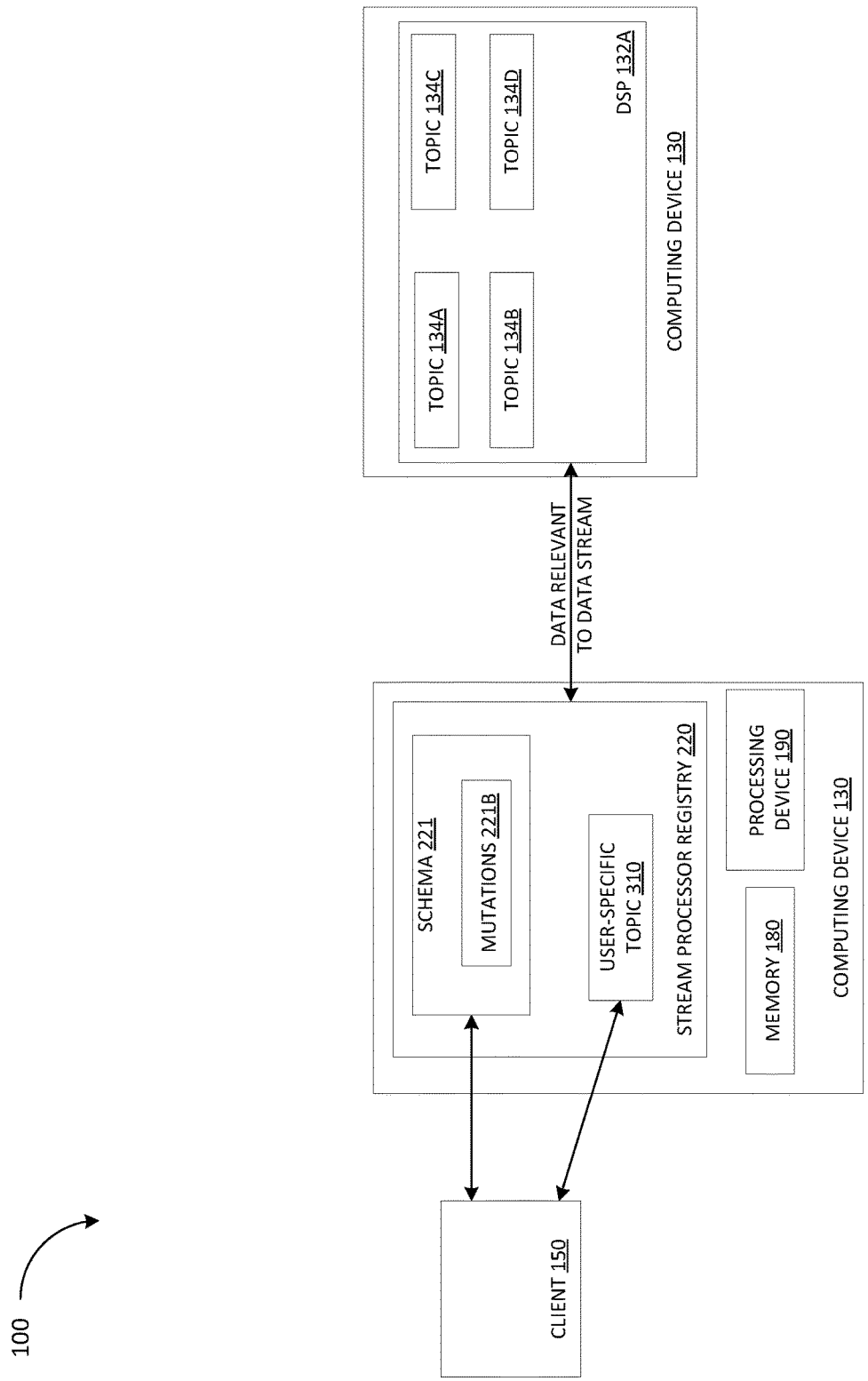
FIG. 2B is a block diagram that illustrates an example system, in accordance with some embodiments of the present disclosure.

FIGS. 2A and 2B illustrate the system 100 in accordance with some embodiments of the present disclosure. Computing device 130A may host the DSP 132A, which may be organized into a plurality of topics 134A-134D. A topic may be a data pipeline that represents a category/feed name to which records are stored and published. The records of the DSP 132A may be organized into the topics 134A-134D. Producer applications 160 may write data to topics 134 and consumer applications 170 may read data from topics 134.

Applications may connect to the DSP 132A and transfer a record onto a topic 134. A record can include any kind of information such as information about an event that has happened on a website, or an event that is supposed to trigger another event. Another application may connect to the DSP 132A and process or re-process records from a topic 134.

The DSP 132A may comprise a connection module 133 (e.g., Kafka Connect) for connecting the DSP 132A with external systems such as stream processing tools, databases, key-value stores, search indexes, and file systems. The connection module 133 may allow data to be streamed to and from any such external systems. The connection module 133 may run with streaming and batch-oriented systems on a single node/computing device 130 (standalone), or may be scaled to an organization-wide service (distributed). As shown in FIG. 2A, the connection module 133 may connect the DSP 132A to a database 180, where the underlying data of topics 134 may be streamed from.

As discussed herein, data streaming platforms do not provide the ability to stream anything that has been defined client-side or the ability to specify streaming requirements from the client-side without engaging with server-side functionality or deploying serverless containers. The embodiments described herein provide a unique approach for building client-side data streaming solutions where web and mobile client applications can control how the streaming platform works by utilising e.g., GraphQL technology. The embodiments described herein allow developers to use e.g., GraphQL syntax to perform basic stream processing and request topics that will be processed using various rules and actions defined by and provided directly from the client side API. Client-side users may dynamically create, duplicate, connect to and filter topics without deploying a dedicated streaming solution.

Continuing to refer to FIGS. 2A and 2B, the DSP 132A may connect to a stream processor registry 220 (herein after referred to as "SPR 220") via the connect module 133. The SPR 220 may implement a server-side run-time for executing stream processor functionality (e.g., via memory 180 and processing device 190). For example, GraphQL may provide a server-side runtime (GraphQL server) for executing queries, as well as a query language for the API of a client 150. Although the embodiments herein are described with the SPR 220 implementing a GraphQL server 221A as the server-side run-time, any appropriate run-time using any appropriate query language may be used. GraphQL may be language agnostic in that it is not tied to any specific database or storage engine and is instead backed by the client 150's existing code and data, around which a user interface can be built. The client 150 may refer to another computing device 130, on which a user of the DSP 132A (e.g., a consumer seeking data from topics 134) may run one or more applications for specifying stream processing topologies using the GraphQL query language as discussed in further detail herein.

The client 150 may create a GraphQL server 221A by defining a schema 221 having object types and fields. The schema 221 may describe the relevant data and functionality the GraphQL server 221A can provide to client applications that connect to it. Once the GraphQL server 221A is running (e.g., at a URL on a web service hosted on computing device 130B), it can receive GraphQL queries to validate and execute. The GraphQL server 221A may first check a received query to ensure that it only refers to object types and fields defined in the schema 221, and may then run the corresponding functions provided by the schema 221 to produce a result. The schema 221 may include object types, which each represent a type of object that may be fetched by the GraphQL server 221A, and may further include various fields (that each include functions/arguments) for each object type. One object type is a mutation type, which may include rules that define the particular data that the client 150 wants to search for as well as functions/operations the client 150 wants to perform (collectively referred to as a "stream processing topology"). The list of mutations that the GraphQL server 221A supports (as defined in the schema 221) may describe all of the functions that a client can perform, for example. The client 150 may define functions/operations within the fields on a mutation type object, and those fields may be available as the root mutation fields the client 150 may call in a subsequent query.

For example, a mutation may define an API endpoint that alters data (e.g., inserting data into a database or altering data already in a database). A mutation may map to a database create or update operation so that if data on the server is modified, the client 150 can learn about those modifications.

The schema 221 may act as the binding API contract that every component of system 100 operates through. The client 150 may define the schema 221 including mutations (rules/functions) that define the data to be included in as well as the format for a desired user stream(s) and transmit the schema 221 to the SPR 220. The SPR 220 may store the definitions of the schema 221 as metadata. In this way, instead of creating stream processing topologies in the DSP 132A, the SPR 220 may dynamically create stream processing topologies based on the metadata corresponding to schema 221 when a subscription defined within the schema 221 (which contains all of the required metadata to build the stream processor dynamically) is called, as discussed in further detail herein.

A subscription may be an operation that watches events emitted from the GraphQL server 221A. Unlike queries, subscriptions maintain an active connection to the GraphQL server 221A (e.g., via WebSocket). This enables the GraphQL server 221A to push updates to the subscription's result over time. Subscriptions provide the ability to emit messages asynchronously out of the GraphQL API from within query or mutation execution logic. Subscriptions may be used to notify the client 150 in real time about changes to back-end data, such as the creation of a new object or updates to an important field. In this way, the SPR 220 may allow developers to expose unstructured database changes as streams.

A subscription may be defined on both the server side and the client side, as with queries and mutations. More specifically, the client 150 may define available subscriptions in the schema 221 as fields of a subscription type object. For example, the client 150 may define the schema 221 to include one or more subscriptions corresponding to offset rules, filter rules, aggregation rules, and windowing rules. In this way, the client 150 may further shape the desired user stream by applying offsets, filters, aggregation and windowing rules to the user stream when calling the subscription as discussed in further detail herein.

Figure 3:
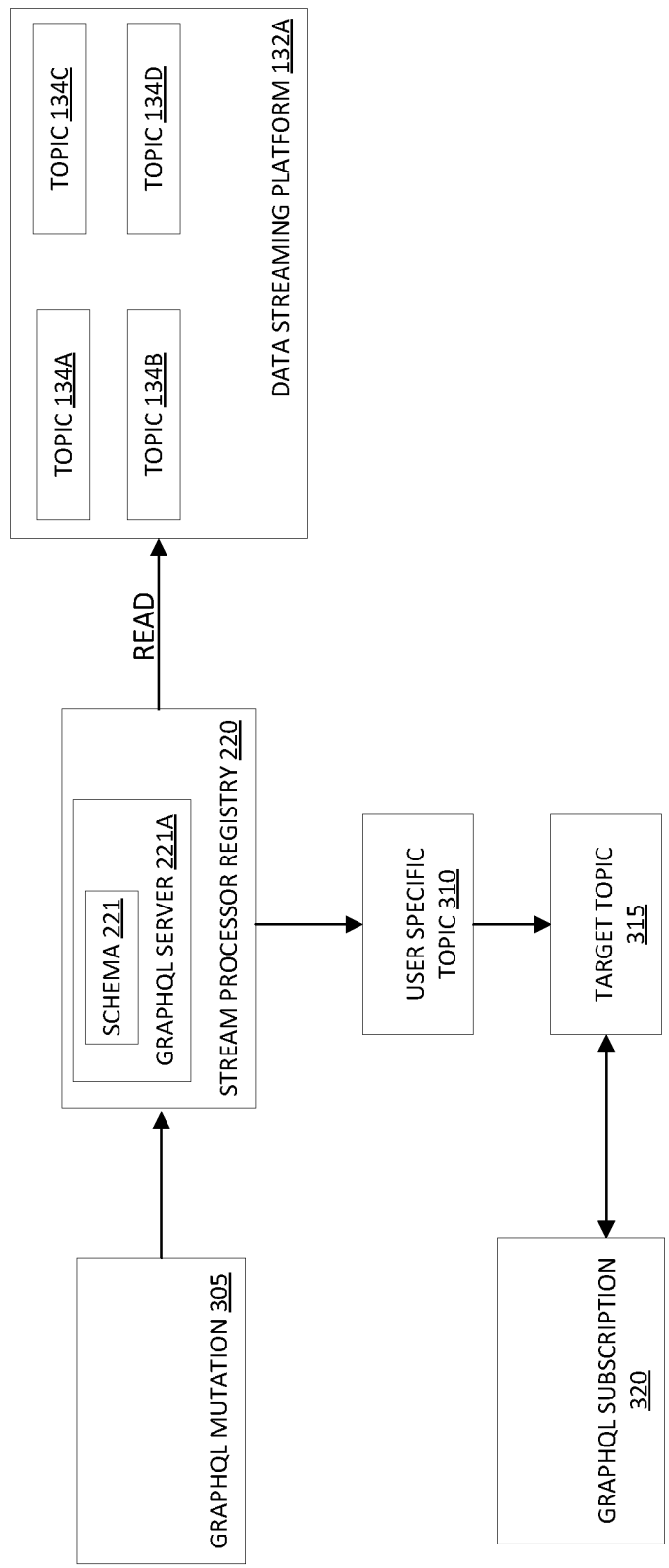
FIG. 3 is a functional block diagram illustrating a processor for specifying a stream processing topology via a client-side API, in accordance with some embodiments of the present disclosure.

FIG. 3 is a functional block diagram illustrating the process of specifying a stream processing topology (logic for dynamically creating topics, interacting with these topics, merging the topics, reading from the topics, and obtaining dynamic insights therefrom) client-side without server-side support.

The client 150 may define a schema 221 using any appropriate query language such as GraphQL, as discussed herein, which may include one or more mutations that define the data to be included in as well as the format for a desired user stream(s). The client 150 may transmit the schema 221 to the SPR 220, which may store the schema 221 as metadata that indicates to the SPR 220 (acting as a GraphQL server) e.g., how the user stream(s) should be built, what the sources of data for the user stream(s) are, and what operations to perform in response to certain events etc. The SPR 220 may utilize the stored metadata to gather data that is relevant to the user stream(s) (from the topics 134) in real-time. In the example of FIG. 3, the client 150 may define a schema having a mutation 305, which it may use to register (i.e., specify) a user stream with the SPR 220.

Based on the metadata of the mutation 305, the SPR 220 may generate a stream processing topology to read certain topics 134 (e.g., topics 134A and 134B) from the data streaming platform and begin gathering data that is relevant to the user stream(s). More specifically, the SPR 220 may process relevant events from the topics 134A and 134B in real-time based on the mutation 305 (e.g., the data and functions specified thereby). The SPR 220 may create a user-specific topic 310 which can be referenced and begin allocating the data that is relevant to the user stream(s) inside of it. This is beneficial because the SPR 220 knows based on the definitions of the mutation 305 that the client 150 wants specific data in the specific format defined by the mutation metadata, so the client 150 may call a subscription to the user-specific topic 310. In some embodiments, the SPR 220 may generate the stream processing topology to read certain topics 134 (e.g., topics 134A and 134B) from the data streaming platform 132A and begin gathering data that is relevant to the user stream(s) in response to receiving a call from the client 150 to a subscription to the user-specific topic 310. When the client 150 calls the subscription (predefined in the schema 221 as discussed herein) to the user-specific topic 310 they may further narrow the user-specific topic 310 to a target topic 315 by applying e.g., offsets, filters, aggregation and windowing rules which are specified in the subscription call.

The SPR 220 may also provide a unique client identifier (ID) based on the query and currently authorized user (e.g., client 150). The client ID may be a UUID, generated unique id, or a username if the client 150 is authenticated. The SPR 220 may generate the client ID in order to uniquely identify the client 150 and the related data that has been processed e.g., filters, topics created etc. The client ID is particularly suited to uniquely identifying the client 150 and preventing clashes (i.e. ensuring that the client 150 only subscribes to the target topic that's related to their request and not a target topic of other clients). The client ID is also used during garbage collection of the target topic 315 since it may be short lived and depend on a user session of the client 150 (e.g., the target topic 315 may be marked for deletion when the user logs out).

In this way, embodiments of the present disclosure allow the client 150 to build applications that give developers dedicated and disposable data streams by creating new topics that can be filtered and aggregated using GraphQL syntax. For example, when the client 150 logs into such an application, he/she can request updates for his/her own dashboard. This will either reconnect to an existing topic or create a new one. Client side applications can not only schedule topics but also decide what the data should be composed with and what filtering and aggregation rules should be applied. This all happens from the client side application, giving end users an almost unlimited way to shape dynamic data streams. When the client 150 logs out, the target topic 315 can be marked for deletion while source stream will still exist. Because the target topic 315 is bound to the client 150 and is specific to the client 150, it can be safely deleted (e.g., in a manner similar to the mark and sweep algorithm for garbage collectors). The source topics (e.g., topics 134) are topics that are not user specific, and act as the source from where the SPR 220 reads all its data from and are not bound to any one specific client. Topics 134 are where all the events "of a certain type/contract" come from and thus remain constant as SPR 220 may interact with it in context of other clients/users.

Figure 4:
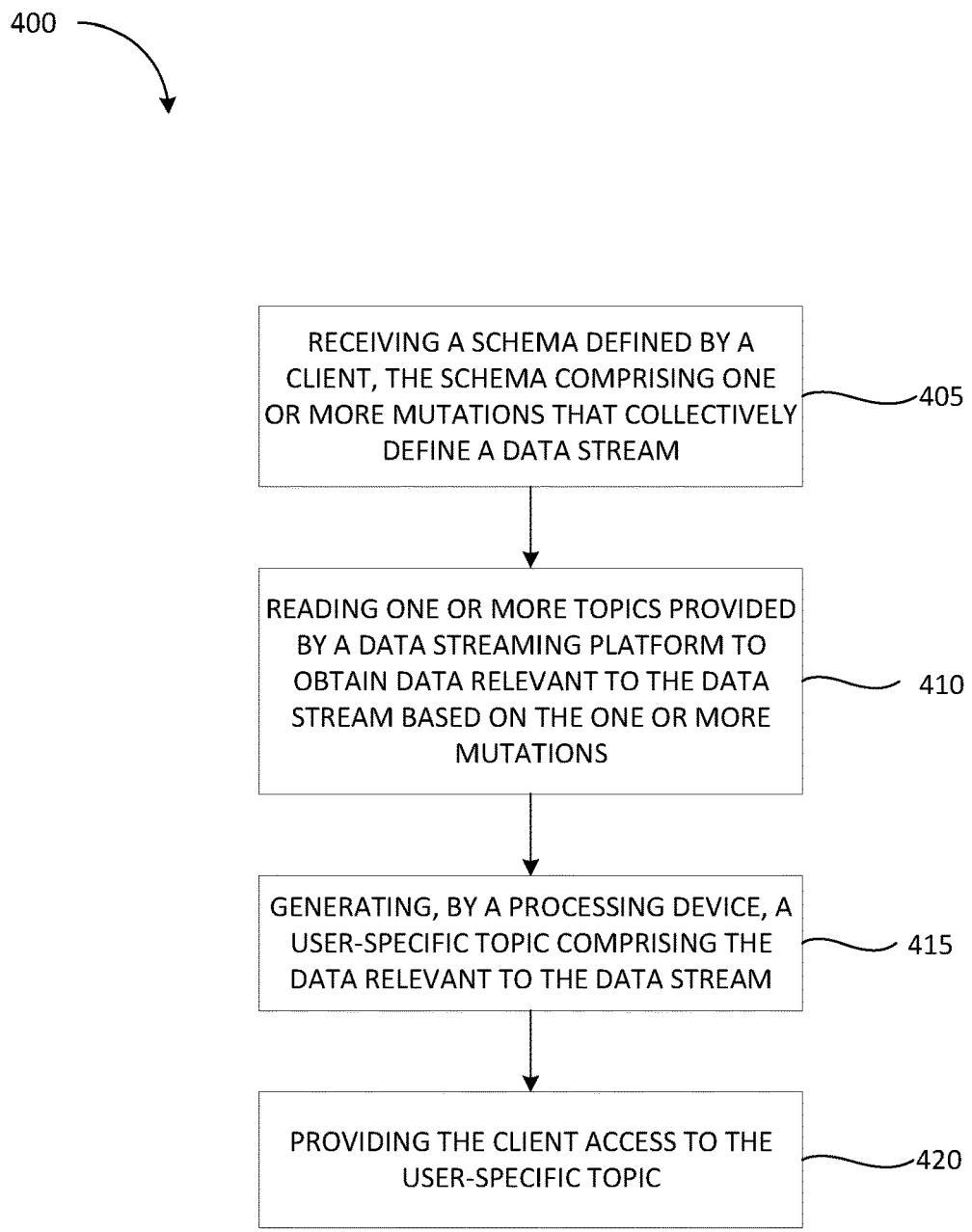
FIG. 4 is a flow diagram of a method for specifying a stream processing topology via a client-side API, in accordance with some embodiments of the present disclosure.

FIG. 4 is a flow diagram of a method 400 of specifying a stream processing topology (dynamically creating topics, interacting with these topics, merging the topics, reading from the topics, and obtaining dynamic insights therefrom) via a client-side API without server-side support, in accordance with some embodiments of the present disclosure. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof in some embodiments, the method 400 may be performed by a computing device (e.g., computing device 130 executing SPR 220 as illustrated in FIGS. 2 and 3).

Referring also to FIGS. 2A and 3, the client 150 may define a schema 221 using any appropriate query language such as GraphQL, as discussed herein, which may include one or more mutations that define the data to be included in as well as the format for a desired user stream(s). The client 150 may transmit the schema 221 to the SPR 220, which at block 405 may receive the schema 221 and store it as metadata that indicates to the SPR 220 (acting as a GraphQL server) e.g., how the user stream(s) should be built, what the sources of data for the user stream(s) are, and what operations to perform in response to certain events etc. The SPR 220 may utilize the stored metadata to gather data that is relevant to the user stream(s) by reading from the topics 134 in real-time. In the example of FIG. 3, the client 150 may define a schema having a mutation 305, which it may use to register (i.e., specify) a user stream with the SPR 220.

Based on the metadata of the mutation 305, at block 410 the SPR 220 may generate a stream processing topology to read certain topics 134 (e.g., topics 134A and 134B) from the data streaming platform 132A and begin gathering data that is relevant to the user stream(s). More specifically, the SPR 220 may process relevant events from the topics 134A and 134B in real-time based on the mutation 305 (e.g., the data and functions specified thereby). At block 415, the SPR 220 may create a user-specific topic 310 which can be referenced and begin allocating the data that is relevant to the user stream(s) inside of it. This is beneficial because the SPR 220 knows based on the definitions of the mutation 305 that the client 150 wants specific data in the specific format defined by the mutation metadata, so the client 150 may call a subscription to the user-specific topic 310. In some embodiments, the SPR 220 may generate a stream processing topology to read certain topics 134 (e.g., topics 134A and 134B) from the data streaming platform 132A and begin gathering data that is relevant to the user stream(s) in response to receiving a call from the client 150 to a subscription to a user-specific topic 310.

At block 420, the SPR 220 may provide the client 150 access to the user-specific topic 310. In addition, when the client 150 calls the subscription (predefined in the schema 221 as discussed herein) to the user-specific topic 310, they may further narrow the user-specific topic 310 to a target topic 315 by specifying e.g., offsets, filters, aggregation and windowing rules in the subscription call to the user-specific topic 310. Thus, the SPR 220 may provide portions of the data that is relevant to the user stream(s) (e.g., from the target topic 315) to the client 150 based on the offsets, filters, aggregation and windowing rules which are specified in the subscription call to the user-specific topic 310.

The SPR 220 may also provide a unique client identifier (ID) based on the query and currently authorized user (e.g., client 150). The client ID may be a UUID, generated unique id, or a username if the client 150 is authenticated. The SPR 220 may generate the client ID in order to uniquely identify the client 150 and the related data that has been processed e.g., filters, topics created etc. The client ID is particularly suited to uniquely identifying the client 150 and preventing clashes (i.e. ensuring that the client 150 only subscribes to the target topic that's related to their request and not a target topic of other clients). The client ID is also used during garbage collection of the target topic 315 since it may be short lived and depend on a user session of the client 150 (e.g., the target topic 315 may be marked for deletion when the user logs out).

In this way, embodiments of the present disclosure allow the client 150 to build applications that give developers dedicated and disposable data streams by creating new topics that can be filtered and aggregated using GraphQL syntax. For example, when the client 150 logs into such an application, he/she can request updates for his/her own dashboard. This will either reconnect to an existing topic or create a new one. Client side applications can not only schedule topics but also decide what the data should be composed with and what filtering and aggregation rules should be applied. This all happens from the client side application, giving end users an almost unlimited way to shape dynamic data streams. When the client 150 logs out, the target topic 315 can be marked for deletion while source stream will still exist. Because the target topic 315 is bound to the client 150 and is specific to the client 150, it can be safely deleted (e.g., in a manner similar to the mark and sweep algorithm for garbage collectors). The source topics (e.g., topics 134) are topics that are not user specific, and act as the source from where the SPR 220 reads all its data from and are not bound to any one specific client. Topics 134 are where all the events "of a certain type/contract" come from and thus remain constant as SPR 220 may interact with it in context of other clients/users.

Figure 5:
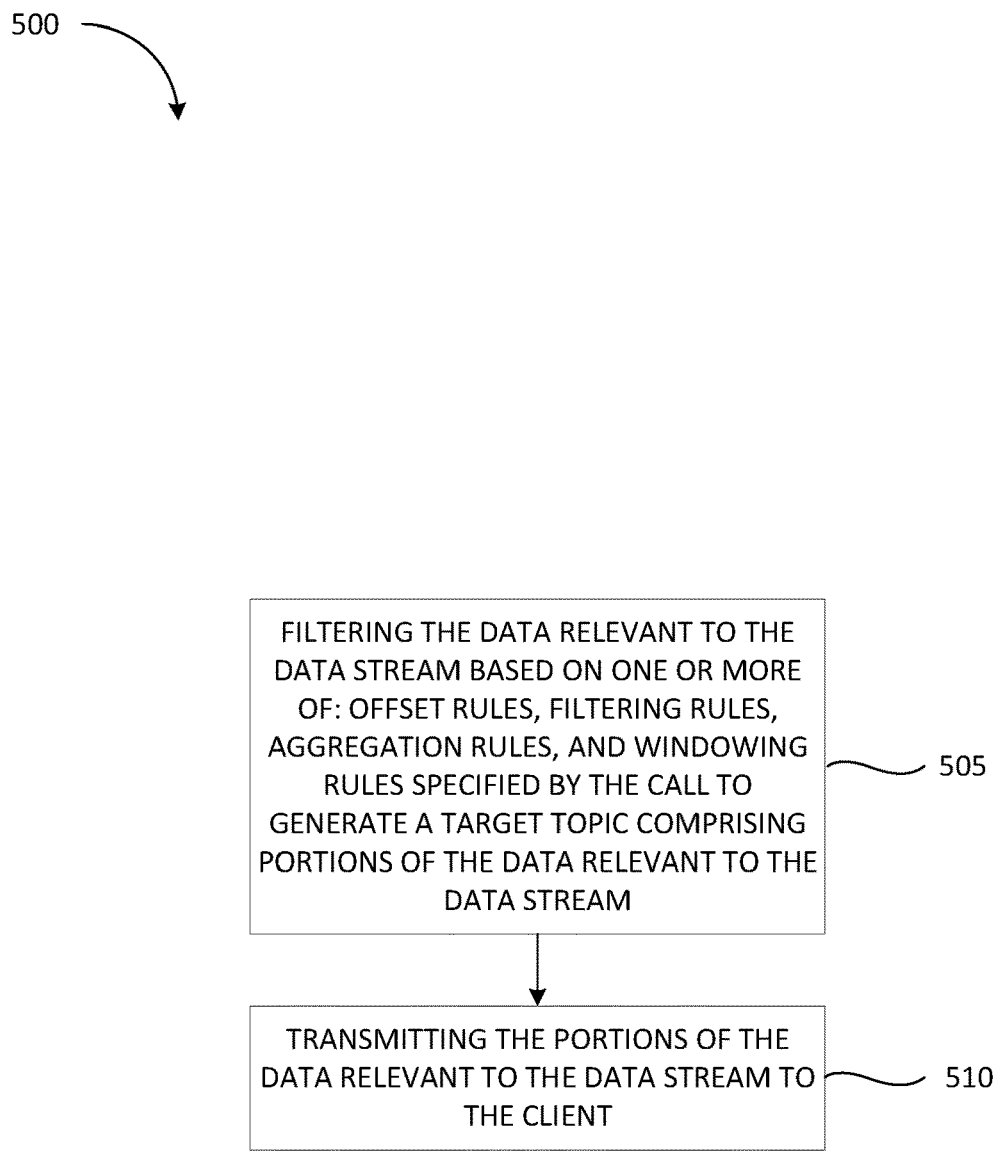
FIG. 5 is a flow diagram of a method for filtering a desired user stream, in accordance with some embodiments of the present disclosure.

FIG. 5 is a flow diagram of a method 500 of narrowing the user-specific topic 310 to a target topic 315, in accordance with some embodiments of the present disclosure. Method 500 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 500 may be performed by one or more computing devices (e.g., computing devices 130 illustrated in FIGS. 2 and 3).

Referring also to FIGS. 2A and 3, when the client 150 calls the subscription (predefined in the schema 221 as discussed herein) to the user-specific topic 310, they may further narrow the user-specific topic 310 to a target topic 315 by specifying e.g., offsets, filters, aggregation and windowing rules in the subscription call to the user-specific topic 310. At block 505, the SPR 220 may filter the data relevant to the data stream (e.g., the data of the user-specific topic 310) based the offset rules, filtering rules, aggregation rules, and windowing rules specified by the call to generate a target topic comprising portions of the data relevant to the data stream. At block 510, the SPR 220 may transmit the portions of the data relevant to the data stream to the client 150.

Figure 6:
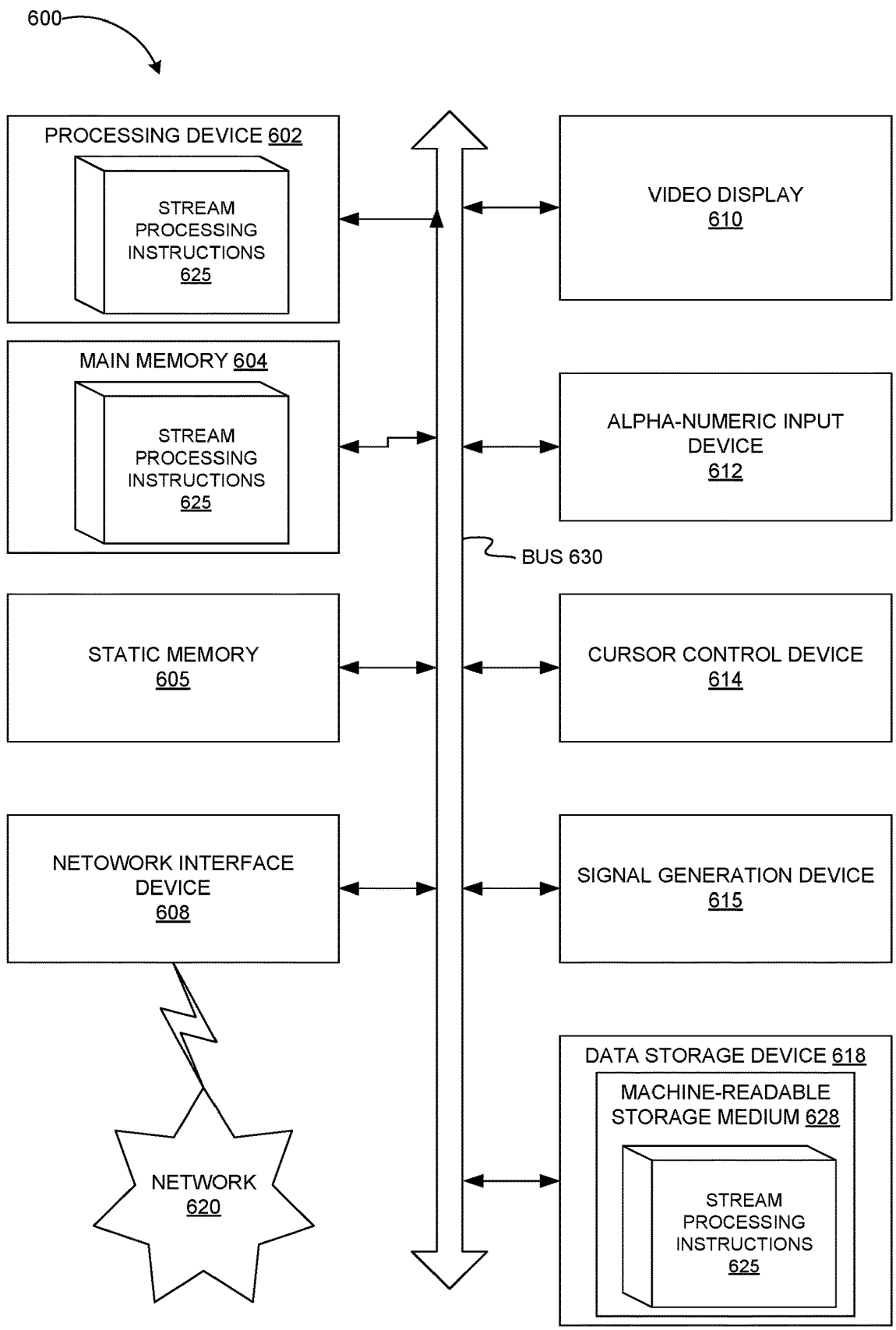
FIG. 6 is a block diagram of an example computing device that may perform one or more of the operations described herein, in accordance with some embodiments of the present disclosure.

FIG. 6 illustrates a diagrammatic representation of a machine in the example form of a computer system 600 within which a set of instructions, for causing the machine to perform any one or more of the methodologies discussed herein for specifying a stream processing topology (dynamically creating topics, interacting with these topics, merging the topics, reading from the topics, and obtaining dynamic insights therefrom) via a client-side API without server-side support. The machine may generate a schema at a client-side application using a query language, wherein the schema comprises one or more mutations that collectively define a data stream and can be executed by a server-side run time corresponding to the query language. A stream processor registry acting as a server-side run time corresponding to the query language may receive the schema from the client and store the mutations as metadata that defines a stream processing topology. The stream processor registry may read one or more topics provided by a data streaming platform to obtain data relevant to the data stream based on the one or more mutations and generate a user-specific topic comprising the data relevant to the data stream. The stream processor registry may perform these functions in response to receiving a subscription call to the user-specific topic. In addition, the stream processor registry may filter the data relevant to the data stream based on one or more of: offset rules, filtering rules, aggregation rules, and windowing rules specified by the call. In this way, a target topic comprising the portions of the data relevant to the data stream may be generated and the portions of the data relevant to the data stream may be provided to the client.

In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 600 may be representative of a server.

The exemplary computer system 600 includes a processing device 602, a main memory 604 (e.g., read-only memory (ROM), flash memory, dynamic random access memory (DRAM), a static memory 606 (e.g., flash memory, static random access memory (SRAM), etc.), and a data storage device 618, which communicate with each other via a bus 630. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Computing device 600 may further include a network interface device 608 which may communicate with a network 620. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 616 (e.g., a speaker). In one embodiment, video display unit 610, alphanumeric input device 612, and cursor control device 614 may be combined into a single component or device (e.g., an LCD touch screen).

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute stream processing instructions 625, for performing the operations and steps discussed herein.

The data storage device 618 may include a machine-readable storage medium 628, on which is stored one or more sets of stream processing instructions 625 (e.g., software) embodying any one or more of the methodologies of functions described herein. The stream processing instructions 625 may also reside, completely or at least partially, within the main memory 604 or within the processing device 602 during execution thereof by the computer system 600; the main memory 604 and the processing device 602 also constituting machine-readable storage media. The stream processing instructions 625 may further be transmitted or received over a network 620 via the network interface device 608.

The machine-readable storage medium 628 may also be used to store instructions to perform a method for specifying a stream processing topology (dynamically creating topics, interacting with these topics, merging the topics, reading from the topics, and obtaining dynamic insights therefrom) via a client-side API without server-side support, as described herein. While the machine-readable storage medium 628 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Unless specifically stated otherwise, terms such as "receiving," "routing," "updating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
   receiving a schema defined by a client, the schema comprising one or more mutations that collectively define a data stream, wherein each of the one or more mutations comprise a set of rules that define data the client wants to search for;
   reading one or more topics provided by a data streaming platform to obtain data relevant to the data stream based on the one or more mutations;
   generating, by a processing device, a single user-specific topic comprising the data relevant to the data stream; and
   providing the client access to the user-specific topic.

2. The method of claim 1, wherein providing the client access to the user-specific topic comprises:
   transmitting portions of the data relevant to the data stream to the client based on a call to a subscription to the user-specific topic by the client.

3. The method of claim 2, further comprising:
   filtering the data relevant to the data stream based on one or more of: offset rules, filtering rules, aggregation rules, and windowing rules specified by the call to generate a target topic comprising the portions of the data relevant to the data stream.

4. The method of claim 1, wherein the schema is received by a stream processor registry that functions as a server-side run time to obtain the data relevant to the data stream by executing functions specified by the one or more mutations.

5. The method of claim 4, further comprising:
   storing the one or more mutations as metadata with the stream processor registry, wherein the stream processor registry utilizes the metadata to build a stream processor to obtain the data relevant to the data stream in response to a call to a subscription to the user-specific topic by the client.

6. The method of claim 4, wherein the schema is defined using a query language corresponding to the server-side run time.

7. The method of claim 6, wherein the query language is GraphQL.

8. A system comprising:
   a memory; and
   a processing device operatively coupled to the memory, the processing device to:
   receive a schema defined by a client, the schema comprising one or more mutations that collectively define a data stream, wherein each of the one or more mutations comprise a set of rules that define data the client wants to search for;
   read one or more topics provided by a data streaming platform to obtain data relevant to the data stream based on the one or more mutations;
   generate a single user-specific topic comprising the data relevant to the data stream; and
   provide the client access to the user-specific topic.

9. The system of claim 8, wherein to provide the client access to the user-specific topic, the processing device is to:
   transmit portions of the data relevant to the data stream to the client based on a call to a subscription to the user-specific topic by the client.

10. The system of claim 9, wherein the processing device is further to:
    filter the data relevant to the data stream based on one or more of: offset rules, filtering rules, aggregation rules, and windowing rules specified by the call to generate a target topic comprising the portions of the data relevant to the data stream.

11. The system of claim 8, wherein the schema is received by a stream processor registry that functions as a server-side run time to obtain the data relevant to the data stream by executing functions specified by the one or more mutations.

12. The system of claim 11, wherein the processing device is further to:
    store the one or more mutations as metadata with the stream processor registry, wherein the stream processor registry utilizes the metadata to build a stream processor to obtain the data relevant to the data stream in response to a call to a subscription to the user-specific topic by the client.

13. The system of claim 11, wherein the schema is defined using a query language corresponding to the server-side run time.

14. The system of claim 13, wherein the query language is GraphQL.

15. A non-transitory computer-readable medium, having instructions stored thereon which, when executed by a processing device, cause the processing device to:
    receive a schema defined by a client, the schema comprising one or more mutations that collectively define a data stream, wherein each of the one or more mutations comprise a set of rules that define data the client wants to search for;

read one or more topics provided by a data streaming platform to obtain data relevant to the data stream based on the one or more mutations;

generate, by the processing device, a single user-specific topic comprising the data relevant to the data stream; and provide the client access to the user-specific topic.

16. The non-transitory computer-readable medium of claim 15, wherein to provide the client access to the user-specific topic, the processing device is to:

transmit portions of the data relevant to the data stream to the client based on a call to a subscription to the user-specific topic by the client.

17. The non-transitory computer-readable medium of claim 16, wherein the processing device is further to:

filter the data relevant to the data stream based on one or more of: offset rules, filtering rules, aggregation rules, and windowing rules specified by the call to generate a target topic comprising the portions of the data relevant to the data stream.

18. The non-transitory computer-readable medium of claim 15, wherein the schema is received by a stream processor registry that functions as a server-side run time to obtain the data relevant to the data stream by executing functions specified by the one or more mutations.

19. The non-transitory computer-readable medium of claim 18, wherein the processing device is further to:

store the one or more mutations as metadata with the stream processor registry, wherein the stream processor registry utilizes the metadata to build a stream processor to obtain the data relevant to the data stream in response to a call to a subscription to the user-specific topic by the client.

20. The non-transitory computer-readable medium of claim 18, wherein the schema is defined using a query language corresponding to the server-side run time.

* * * * *